United States Patent
Chen et al.

(10) Patent No.: US 7,974,197 B2
(45) Date of Patent: Jul. 5, 2011

(54) METHOD OF PRIORITIZING USER THROUGHPUT AND USER THROUGHPUT LIMITS FOR BEST-EFFORT APPLICATION IN CDMA2000 1XEV-DO WIRELESS COMMUNICATION SYSTEM

(75) Inventors: Pi-Chun Chen, Lake Hiawatha, NJ (US); Ren Da, Warren, NJ (US); Yang Yang, Morris Plains, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 235 days.

(21) Appl. No.: 12/019,691

(22) Filed: Jan. 25, 2008

(65) Prior Publication Data

US 2009/0190475 A1 Jul. 30, 2009

(51) Int. Cl.
*H04J 1/16* (2006.01)
(52) U.S. Cl. .......................................... 370/231
(58) Field of Classification Search .................. 370/351, 370/389, 395.1, 395.4, 395.42, 395.43, 229, 370/235, 236, 236.1, 230, 231; 455/39, 68, 455/69
See application file for complete search history.

(56) References Cited

U.S. PATENT DOCUMENTS

| | | | |
|---|---|---|---|
| 2003/0039267 A1* | 2/2003 | Koo et al. | 370/465 |
| 2005/0141454 A1* | 6/2005 | Jain et al. | 370/331 |
| 2006/0252429 A1 | 11/2006 | Chen et al. | 455/450 |
| 2007/0070894 A1* | 3/2007 | Wang et al. | 370/230 |
| 2007/0070908 A1 | 3/2007 | Ghosh et al. | 370/236 |
| 2007/0099647 A1* | 5/2007 | Lee et al. | 455/522 |
| 2009/0103507 A1* | 4/2009 | Gu et al. | 370/342 |

OTHER PUBLICATIONS

International PCT Search Report PCT/US2009/000381 dated Aug. 4, 2009.
Written Opinion based on International PCT Search Report PCT/US2009/000381 dated Aug. 4, 2009.

* cited by examiner

*Primary Examiner* — Kwang B Yao
*Assistant Examiner* — Obaidul Huq
(74) *Attorney, Agent, or Firm* — Williams, Morgan & Amerson, PC

(57) ABSTRACT

The present invention provides a method implemented in a mobile unit configured to communicate with at least one base station over an uplink. The method includes receiving, at the mobile unit and from the base station, a first attribute indicative of a traffic-to-pilot power ratio and a second attribute indicative of a resource provision limit. The first attribute is formed based on a priority weight associated with best effort communication with the mobile unit. The second attribute is formed based on a maximum throughput associated with best effort communication with the mobile unit. The method also includes modifying an uplink transmission power based upon the first attribute and information indicative of congestion at the base station.

22 Claims, 6 Drawing Sheets

METHOD OF PRIORITIZING USER THROUGHPUT AND USER THROUGHPUT LIMITS FOR BEST-EFFORT APPLICATION IN CDMA2000 1XEV-DO WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Conventional wireless communication systems include a network of base stations, base station routers, and/or other wireless access points that are used to provide wireless connectivity to mobile units in geographic areas (or cells) associated with the network. Information may be communicated between the network and the mobile units over an air interface using wireless communication links that typically include multiple channels. The channels include forward link (or downlink) channels that carry signals from the base stations to the mobile units and reverse link (or uplink) channels that carry signals from the mobile units to the base station. The channels may be defined using time slots, frequencies, scrambling codes or sequences, or any combination thereof. In the 3rd generation Code Division Multiple Access (CDMA) 1xEV-DO system, the channels are defined by modulating signals transmitted on the channels using orthogonal codes or sequences.

Base stations and mobile units share the resources that are available to transmit and receive information over the air interfaces in the wireless communication system. In cdma2000 1xEV-DO systems, the resources include the transmission power available at the base station and/or the mobile unit, codes and or sequences that are used to define the uplink and downlink channels, and the like. Wireless communication systems implement different types of resource management to allocate resources to the base stations and/or mobile units for transmission over the downlink and/or uplink. The resource management techniques can be broadly grouped into two categories: quality of service (QoS) and best effort. In QoS resource management, a user is guaranteed a certain level of service over the air interface. The guaranteed service level may include guarantees on overall data throughput, transmission delay and/or latency, packet error rates, and the like. QoS resource management is typically used for applications such as voice transmission, video transmission, and gaming. These applications are typically delay intolerant so that the user experience may be noticeably affected by variations in overall data throughput, transmission delay and/or latency, packet error rates, and the like. The different levels of QoS are usually tied to different prices so that users can pay additional fees in order to receive higher QoS levels.

In contrast, best effort resource management, typically applied to delay tolerant applications such as web browsing, e-mail, file transfer, and the like, attempts to fairly distribute the available resources among the active users in the wireless communication system. Best effort resource management does not guarantee any particular level of service because the available resources are not guaranteed. For example, the available resources for any given transmission may vary with the number of users, the resources available to a base station or mobile unit, channel conditions, and other factors that may affect the wireless communication system. For example, best effort resource management may not be able to guarantee particular data throughputs, transmission delays and/or latencies, packet error rates, and the like. Furthermore, all of the applications that are allocated resources using best effort resource management will be treated approximately the same and receive approximately the same amount of resources given the same RF environment. As a result, users with similar RF conditions running similar types of best effort applications in the same network will have pretty much the same user experience in terms of data throughputs, transmission delay and/or latencies, packet error rates, and the like.

Although best effort resource management can be an effective way of fairly distributing resources to users, applying a single resource allocation criterion to all best effort applications limits the ability of service providers to offer attractive pricing strategies in the competitive wireless markets and for jurisdictional requirement in some areas. For example, conventional best effort resource management schemes do not allow users running best effort applications to be divided into different priority weights that allow variations in the relative user experiences in the same network.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for implementation in a mobile unit configured to communicate with at least one base station over an uplink. The method includes receiving, at the mobile unit and from the base station, a first attribute indicative of a traffic-to-pilot power ratio. The first attribute is formed based on a priority weight associated with best effort communication with the mobile unit. The method also includes modifying an uplink transmission power based upon the first attribute and information indicative of congestion at the base station.

In another embodiment of the present invention, a method is provided for implementation in a base station configured to communicate with a plurality of mobile units. The method includes providing, to each of the mobile units and from the base station, a first attribute indicative of a traffic-to-pilot power ratio. The first attribute is formed based on at least one priority weight associated with best effort communication between the base station and the mobile units. The method also includes receiving transmission from the mobile units at an uplink transmission power determined by each mobile unit based upon the first attribute and information indicative of congestion at the base station.

BRIEF DESCRIPTION OF THE DRAWINGS

The invention may be understood by reference to the following description taken in conjunction with the accompanying drawings, in which like reference numerals identify like elements, and in which.

Figure 1:
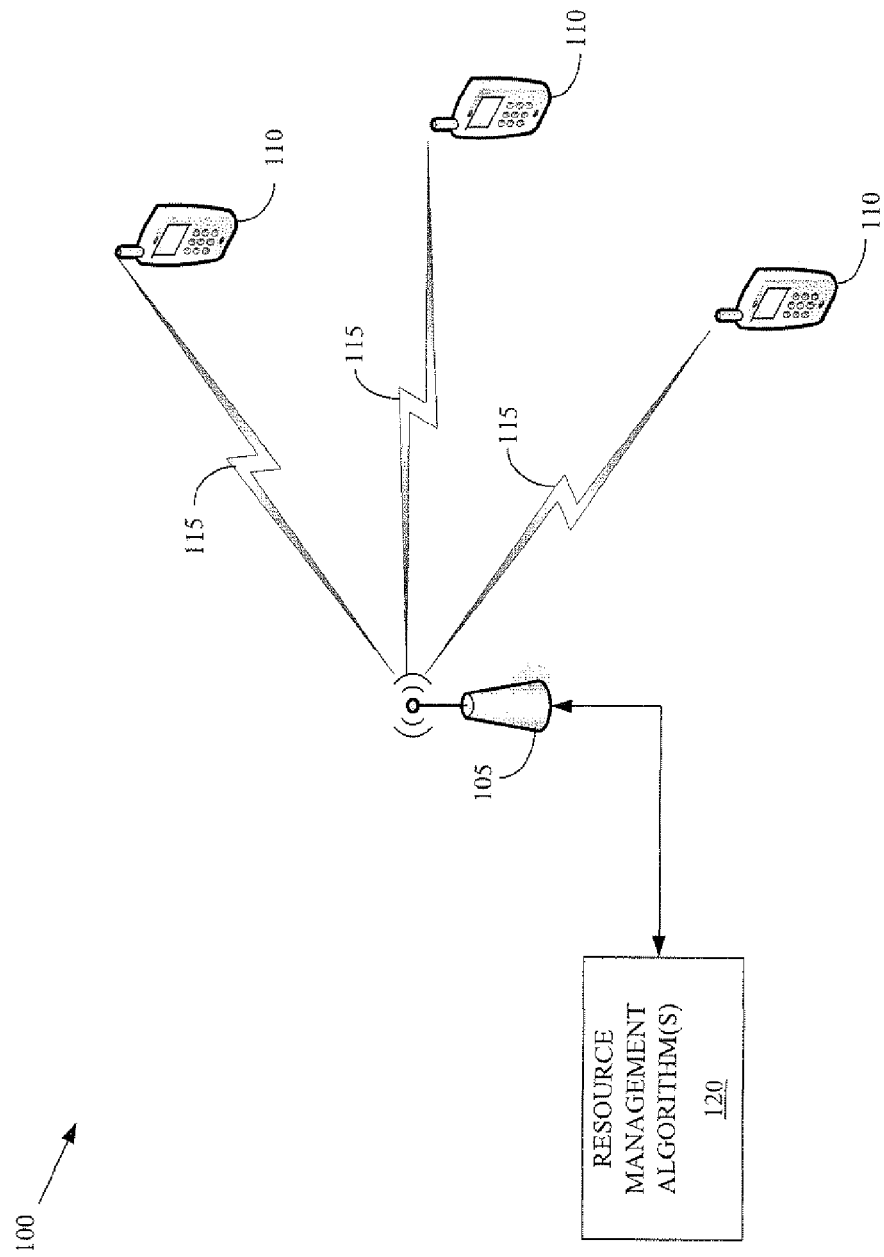
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes one or more base stations 105 (or access networks) that are used to provide wireless connectivity to one or more mobile units 110 over corresponding air interfaces 115. Wireless connectivity may be provided according to the standards and/or protocols defined for 3rd generation Code Division Multiple Access (CDMA) 1xEV-DO systems. Techniques for implementing and/or operating systems that provide wireless connectivity according to 3rd generation wireless standards and/or protocols are known in the art and in the interest of clarity only those aspects of implementing and/or operating the systems that are relevant to the present invention will be discussed herein. Furthermore, persons of ordinary skill in the art having benefit of the present disclosure should appreciate that the present invention is not limited to 3rd generation wireless communication systems. In alternative embodiments, the wireless communication system 100 may be any generation system that operates according to other standards and/or protocols. Examples of other systems that may implement aspects of the present invention include, but are not limited to, next (4th) generation wireless systems such as 802.16e WiMAX, UMTS Long Term Evolution (LTE) and cdma2000 EV-DO Revision C Ultra Mobile Broadband (UMB), which are based on Orthogonal Frequency Division Multiple Access (OFDMA) techniques that may implement Hybrid Automatic Repeat reQuest (HARQ) to increase the capacity of the OFDMA system.

The wireless communication system 100 implements resource management algorithms 120 that may be used to define attributes for managing and/or scheduling the resources used for communication over the air interfaces 115. In one embodiment, the resource management algorithms 120 may be implemented within the base station 105. However, persons of ordinary skill in the art having benefit of the present disclosure should appreciate that in alternative embodiments the resource management algorithms 120 may be implemented in any location or combination of locations. For example, one or more of the resource management algorithms 120 may be implemented in a radio access network (not shown in FIG. 1) that is communicatively coupled to the base station 105.

The resource management algorithms 120 may be configured to allocate resources among the mobile units 110 according to either quality of service (QoS) or best effort resource management techniques. As used herein, the phrase "quality of service resource management" will be understood to refer to resource management techniques or algorithms that guarantee a selected level of service to a mobile unit 110. The QoS guarantee may be embodied as a guarantee on the overall data throughput, the transmission delay or latency, the packet error rates, and the like. Although QoS resource management guarantees a certain level of service to the mobile unit 110, persons of ordinary skill in the art should appreciate that there may be exceptional or unusual circumstances under which the resource management algorithms 120 may not be able to provide the guaranteed service level.

As used herein, the phrase "best effort resource management" will be understood to refer to resource management techniques or algorithms that do not guarantee any particular level of service to the mobile units 110. In contrast to QoS resource management, best effort resource management techniques attempt to fairly distribute the available resources among the active users in the wireless communication system. Since the available resources vary according to the number of users, the total resources available at the base stations 105 and/or the mobile units 110, channel conditions, and other factors that may affect the wireless communication system, best effort resource management does not guarantee any particular level of service. For example, best effort resource management may not be able to guarantee particular data throughputs, transmission delays or latencies, packet error rates, and the like. Best effort resource management is typically applied to delay tolerant applications such as web browsing, e-mail, file transfer, and the like.

Although the resource management algorithms 120 may not be able to guarantee a particular level of service when operating in the best effort mode, the resource management algorithms 120 may be configured to offer different levels of best effort service to different mobile units 110. In one embodiment, the base station or access network 105 can define one or more priority weights for providing each best effort service level. The access network 105 may then select one of the priority weights for each of the mobile units 110 and transmit information indicating the selected priority weight to the corresponding mobile unit 110. For example, users of the mobile units 110 may pay for or subscribe to different levels of best effort service and the payment or subscription information may be conveyed to the access network 105, which may determine the appropriate priority weight based on the subscription and/or payment information. Although in the illustrated embodiment the access network 105 determines the priority weights for the mobile units 110, persons of ordinary skill in the art having benefit of the present disclosure should appreciate that in alternative embodiments other entities in the wireless communication system 100 may determine the priority weights for the mobile units 110. Thus, the wireless communication system 100 may implement a distributed control system in which the mobile units 110 locally run the resource management algorithms using input parameters pre-configured by the access network 105. The distributed inter-user priority resource management algorithms may be used to provide different levels of user experience for best effort applications.

In one embodiment, the access network 105 and/or the resource management algorithms 120 implement a priority average throughput algorithm that determines configuration information to achieve different levels of relative user throughput experience based upon the user's priority weight. The priority weight may be quantified as a number that is used to determine the relative level of throughput allocated to each mobile unit 110. Higher priority weights correspond to higher levels of service. For example, a mobile unit 110 that has an assigned priority weight of 2 should enjoy about twice of the throughput of a mobile unit 110 that has an assigned priority weight of 1 when running best effort applications in the wireless communication system 100. In one embodiment, the relative values of the assigned priority weights correspond to the relative throughputs of the associated mobile units when the wireless communication system 100 has converged to an approximately stable configuration that supports concurrent communication with one or more mobile units 110. The actual number of priority weights is a matter of design choice. For example, in one embodiment only two priority weights may be available to the mobile units 110. However, in another embodiment, 10 or more priority weights may be available to the mobile units 110.

The resource management algorithms 120 may also impose a maximum throughput level that is determined based on the priority weight assigned to each mobile unit 110. In one embodiment, the resource management algorithms 120 can determine the maximum throughput level using the priority weight assigned to each mobile unit 110 and the reverse link best effort bandwidth that is available for best effort communication over the air interface 115. The reverse link best effort bandwidth can be communicated to the entity that supports the resource management algorithms 120.

Figure 2:
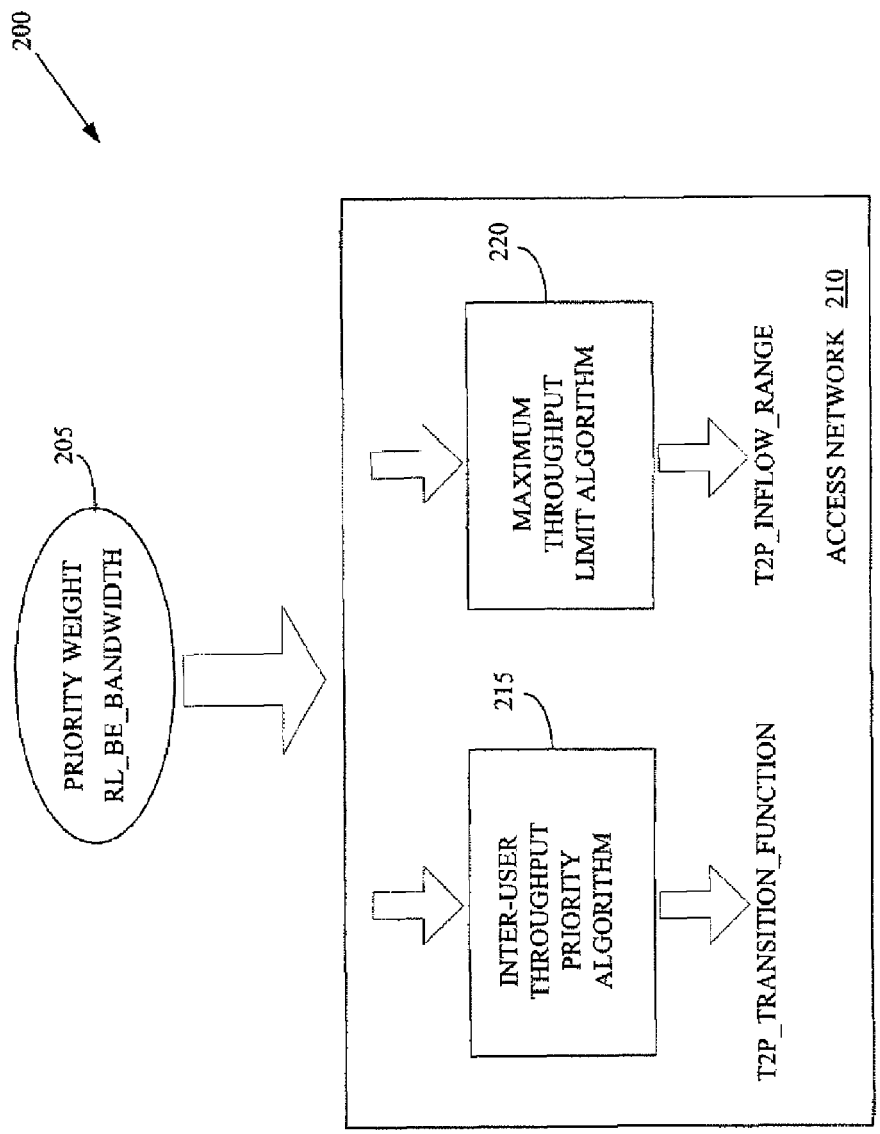
FIG. 2 conceptually illustrates one exemplary embodiment of a method of determining attributes for providing multiple levels of best effort service to a mobile unit, in accordance with the present invention.

FIG. 2 conceptually illustrates one exemplary embodiment of a method 200 of determining attributes for providing multiple levels of best effort service to a mobile unit. In the illustrated embodiment, a service provider provides information 205 indicates one or more priority weights for best effort service over an uplink from one or more mobile units to the access network 210. The service provider also provides information 205 that indicate the available reverse link best effort bandwidth (RL_BE_Bandwidth) that is available for reverse link transmissions from the mobile units to the access network 210. The priority weights may be determined according to any technique including allowing users to purchase or subscribe to relatively higher or relatively lower levels of best effort service.

The access network 210 may then determine attributes that can be used to determine an uplink resource allocation based upon the priority weight and, if available, the maximum throughput information. In the illustrated embodiment, the mobile unit operates according to cdma2000 1xEV-DO Revision A, although persons of ordinary skill in the art having benefit of the present disclosure should appreciate that the present invention is not limited to systems that operate according to this particular standard. In 1xEV-DO Rev A systems, reverse link resource management uses Traffic-to-Pilot power ratio (T2P) control. The T2P power ratio control algorithm attempts to control the pilot power from each access terminal so that the pilot power remains at a stable level. Access terminals that transmit at higher T2P power have a higher user throughput, so the T2P value may be considered the "resource" that is managed by the resource management algorithm. In the illustrated embodiment, the access network 210 defines resource allocation attributes including T2P ratio functions. For example, the access network 210 may define a T2PTransitionFunction, which is a complex attribute that is formed based on two sub-functions: T2PUpFunction and T2PDnFunction. The functional representation of the T2PUpFunction and T2PDnFunction may be modified from their conventional values to allow resources to be allocated based in part on the priority weight(s) associated with best effort resource management.

Figure 4A:
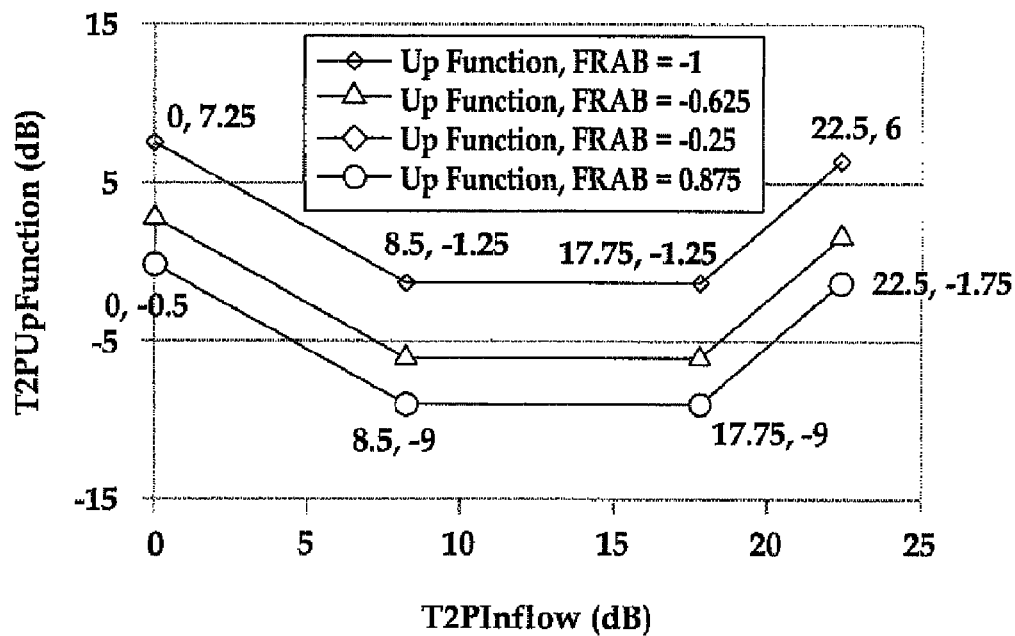
FIG. 4A shows a conventional T2PUpFunction and FIG. 4B shows a T2PUpFunction as a function of a priority weight assigned to a mobile unit, in accordance with the present invention.
Figure 4B:
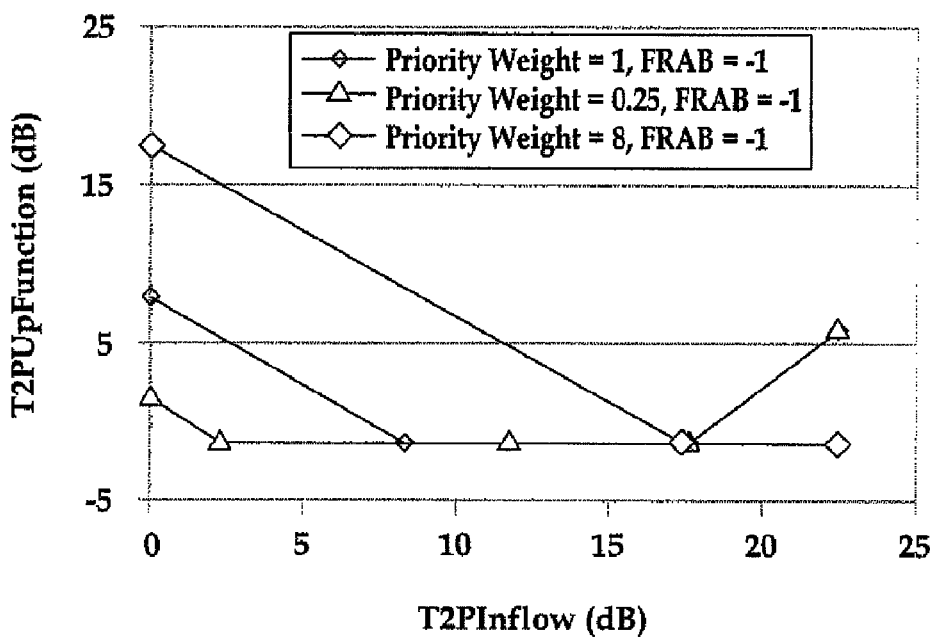

FIG. 4A shows a conventional T2PUpFunction (measured in decibels) that is determined as a function of the T2PInflow (measured in decibels) and values of the Filtered Reverse Activity Bits (FRAB), which may be provided by the access network. The T2PInflow is a measure of resource provision granted periodically in a mobile unit's media access control algorithm. The T2PUpFunction is a three dimension function of T2PInflow values and FRAB value. FIG. 4B shows one exemplary embodiment of a T2PUpFunction (measured in decibels) that is determined based upon the T2PInflow (measured in decibels), values of the Filtered Reverse Activity Bits, and the priority weight that is assigned to the mobile unit. The T2PUpFunction for each priority weight is a three dimension function of T2PInflow values and FRAB value.

Figure 5A:
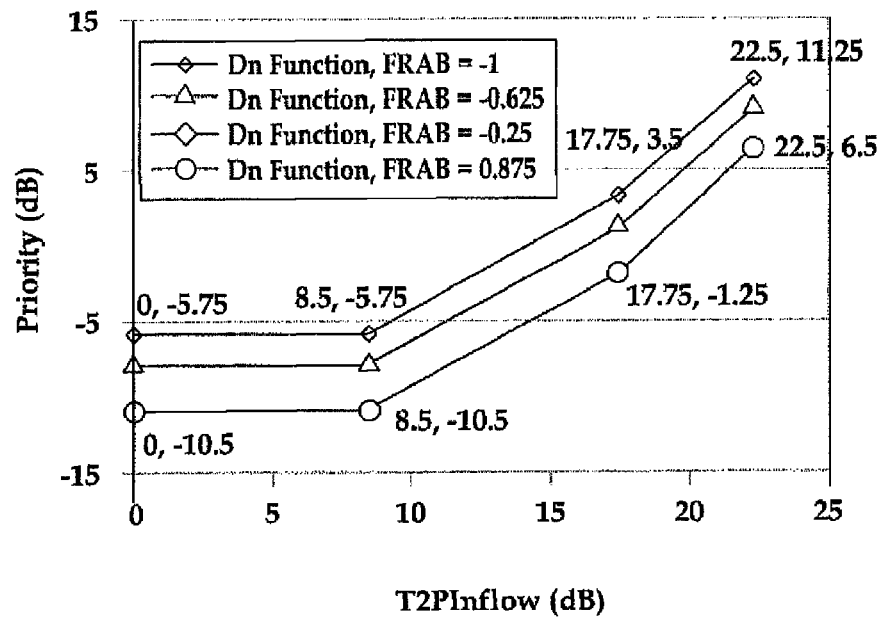
FIG. 5A shows a conventional T2PDnFunction and FIG. 5B shows a T2PDnFunction as a function of a priority weight assigned to a mobile unit, in accordance with the present invention.
Figure 5B:
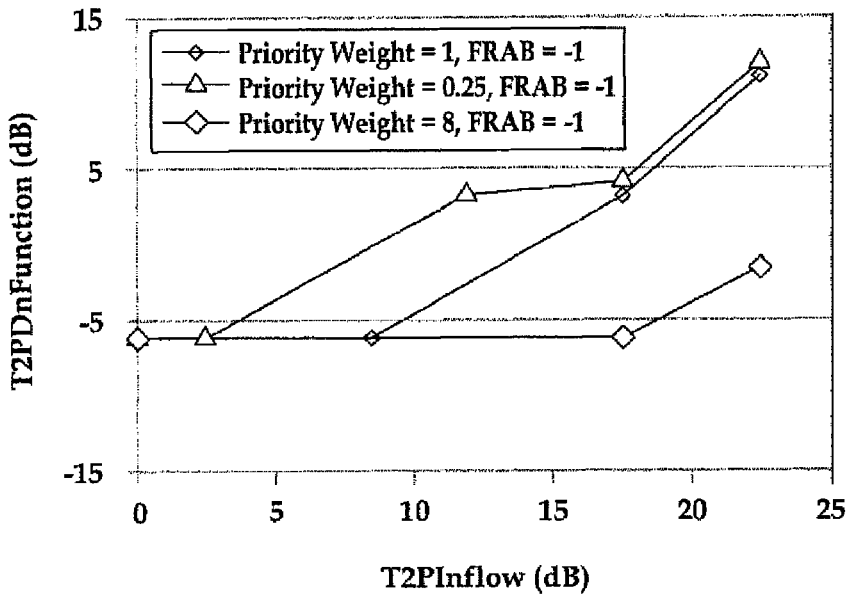

FIG. 5A shows a conventional T2PDnFunction (measured in decibels) that is determined as a function of the T2PInflow (measured in decibels) and values of the Filtered Reverse Activity Bits (FRAB), which may be provided by the access network. The T2PDnFunction is a three dimension function of T2PInflow values and FRAB value. FIG. 5B shows one exemplary embodiment of a T2PDnFunction (measured in decibels) that is determined based upon the T2PInflow (measured in decibels), values of the Filtered Reverse Activity Bits, and the priority weight that is assigned to the mobile unit. The T2PDnFunction for each priority weight is a three dimension function of T2PInflow values and FRAB value.

Figure 6A:
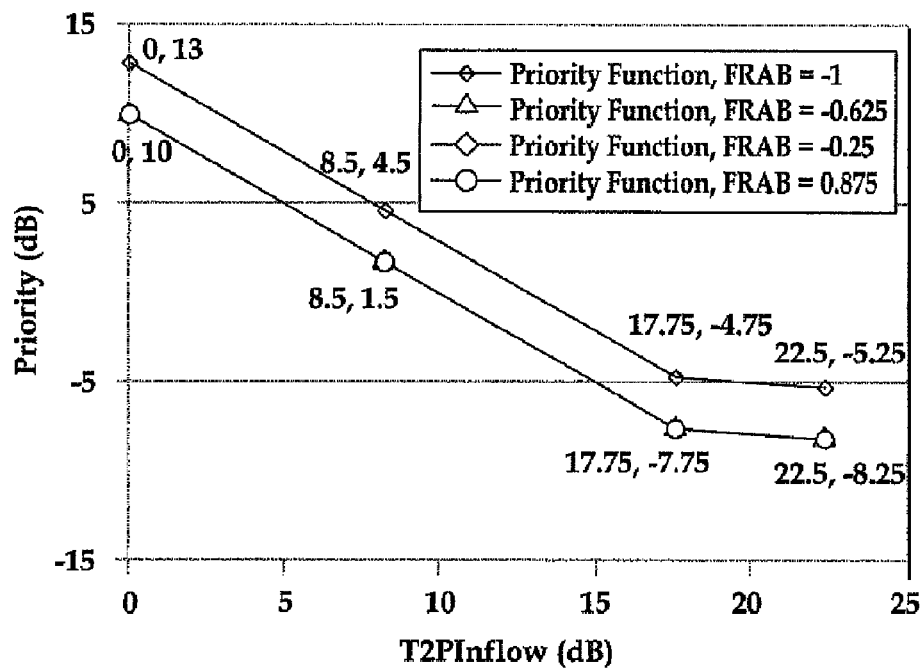
FIG. 6A shows a conventional T2PPriorityFunction and FIG. 6B shows a T2PPriorityFunction as a function of a priority weight assigned to a mobile unit, in accordance with the present invention.
Figure 6B:
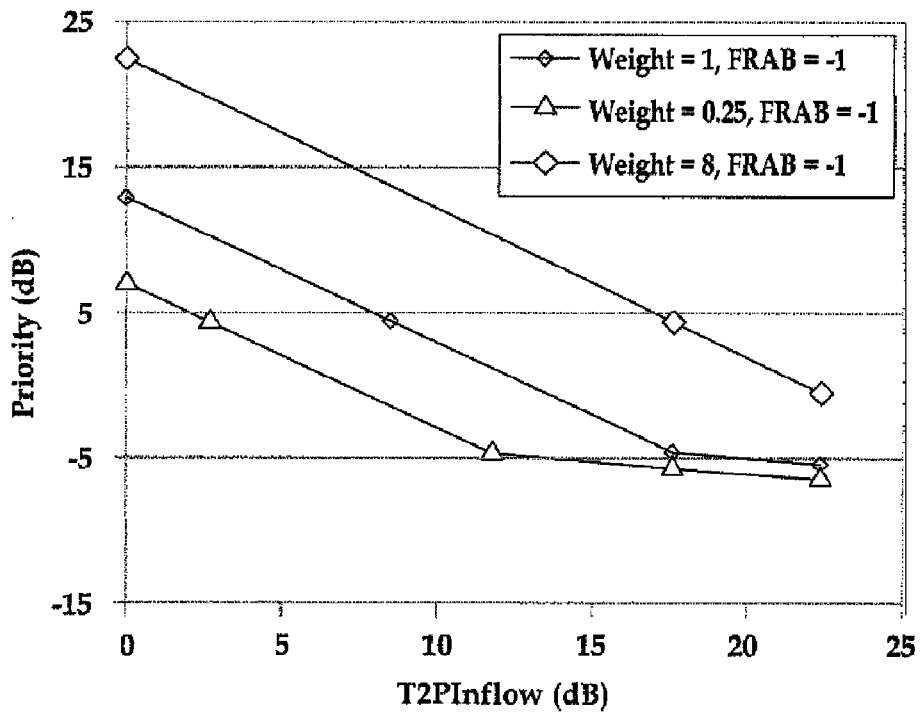

FIG. 6A shows a conventional priority function T2PPriorityFunction (measured in decibels) that is determined as a function of the T2PInflow (measured in decibels)

and values of the Filtered Reverse Activity Bits (FRAB), which may be provided by the access network. The T2PPriorityFunction is a three dimension function of T2PInflow values and FRAB value. FIG. 6B shows one exemplary embodiment of a T2PPriorityFunction (measured in decibels) that is determined based upon the T2PInflow (measured in decibels), values of the Filtered Reverse Activity Bits, and the priority weight that is assigned to the mobile unit. The T2PPriorityFunction for each priority weight is a three dimension function of T2PInflow values and FRAB value.

In the illustrated embodiment, the access network 210 implements a Priority Average Throughput Algorithm 215 to calculate the value of the T2PTransitionFunction for each mobile unit as a function of the priority weight assigned to each mobile unit. In one embodiment, the algorithm produces a new T2PTransitionFunction (e.g., the T2PUpFunction and T2PDnFunction shown in FIGS. 4A/4B and 5A/5B) by shifting the reference T2PPriorityFunction (e.g., the T2PPriorityFunction shown in FIG. 6A) by a factor of 10*log (priority_weight/priority_weight_ref) along the x-axis. The value of the parameter priority_weight is the priority weight of the user in consideration and the value of the parameter priority_weight_ref is the priority weight of the reference. After the shift, a set of boundary conditions may be checked in order to make sure that the new function falls into the correct operation range. Other boundary conditions may also be checked.

One exemplary embodiment of a priority average throughput algorithm may be expressed as pseudocode. For example, the T2PTransitionFunction may expressed in the following notation:

TABLE 1

Reference T2PTransitionFunctionNN (NN = 0x01)

|  | FRABAxis$_0$ | FRABAxis$_1$ | ... | FRABAxis$_n$ |
|---|---|---|---|---|
| T2PAxis$_0$ | a$_{00}$, b$_{00}$ | a$_{01}$, b$_{01}$ | ... | a$_{0n}$, b$_{0n}$ |
| T2PAxis$_1$ | a$_{10}$, b$_{10}$ | a$_{11}$, b$_{11}$ | ... | a$_{1n}$, b$_{1n}$ |
| ... | ... | ... | ... | ... |
| T2PAxis$_{m-1}$ | a$_{(m-1)0}$, b$_{(m-1)0}$ | a$_{(m-1)1}$, b$_{(m-1)1}$ | ... | a$_{(m-1)n}$, b$_{(m-1)n}$ |
| T2PAxis$_m$ | a$_{m0}$, b$_{m0}$ | a$_{m1}$, b$_{m1}$ | ... | a$_{mn}$, b$_{mn}$ |

Where
n=NumFRABAxisValues (the total number of FRAB axis values then is n+1)
m=NumT2PAxisValues (the total number of T2P axis values then is m+1)
T2PAxis$_i$=x$_i$=the i-th T2PAxis value, (i=0,1, ... m)
a$_{ij}$=the T2PUpT2PAxisiFRABAxisj value correspond to x$_i$ and FRABAxis$_j$ (i=0,1, ... m; j=0,1, ... n)
b$_{ij}$=the T2PDownT2PAxisiFRABAxisj value correspond to x$_i$ and FRABAxis$_j$ (i=0,1, ... m; j=0,1, ... n)
The new T2PTransitionFunctionNN (NN=0x01) for each inter-user priority weight w will also have the same format described in Table 1. However, the new table may have different NumT2PAxisValues and will have some entries with different values as in Table 1.
Define
$\hat{m}$=the new NumT2PAxisValues for the new T2PTransitionFunctionNN
$\hat{x}_i$=the new ith T2PAxis value for the new T2PTransitionFunctionNN
$\hat{a}_{i,j}$=the new T2PUpT2PAxisiFRABAxisj value correspond to $\hat{x}_i$ and FRABAxis$_j$ $\hat{b}_{i,j}$=the new T2PDownT2PAxisiFRABAxisj value correspond to $\hat{x}_i$ and FRABAxis$_j$ The inputs to the algorithm are: m, n, w, w$_{ref}$, {x$_i$}, {a$_{i,j}$}, {b$_{i,j}$}, and the outputs from the algorithm are: $\hat{m}$, {$\hat{x}_i$}, {$\hat{a}_{i,j}$}, {$\hat{b}_{i,j}$}. The algorithm contains the following steps in sequence. The double slash "//" is used to mark the code comments.

1) Determine the T2PAxis shift value r
   r=10 log$_{10}$ (w/w$_{ref}$) (dB), where the reference weight is w$_{ref}$.

2) If r<0, identify the lightly-loaded boost for high T2P range and remove the effect of boost for shifting if the boost is identified For j=0 to n, $$B_j = a_{m,j} - \left(a_{m-1,j} + \frac{x_m - x_{m-1}}{x_{m-1} - x_{m-2}}(a_{m-1,j} - a_{m-2,j})\right)$$

If(Bj > 0) & (r < 0)
   a$_{m,j}$ = a$_{m,j}$ − B$_j$
   b$_{m,j}$ = b$_{m,j}$ − B$_j$
End If
End for 3) Shifting the de-boosted T2PUp/Dn curves left or right depending on r. The algorithm makes sure the new T2PAxis values after shifting are limited within the upper bound MaxT2PAxis (0.25*0×FF=63.75 dB) and the lower bound MinT2PAxis (=0 dB). Interpolation operation is conducted when needed.

$\hat{m}$ = m
For i = 0 to m
   For j=0 to n
      $\hat{a}_{i,j}$ = a$_{i,j}$
      $\hat{b}_{i,j}$ = b$_{i,j}$
   End for
   $\hat{x}_i$ = x$_i$ + r
End for
For i=0 to m,
   If$^{\hat{x}_i > MaxT2PAxis}$, $$c_u = \frac{MaxT2PAxis - \hat{x}_{i-1}}{\hat{x}_i - \hat{x}_{i-1}}$$

For j=0 to n
      $\hat{a}_{i,j}$ = $\hat{a}_{i-1,j}$ + c$_u$($\hat{a}_{i,j}$ − $\hat{a}_{i-1,j}$)
      $\hat{b}_{i,j}$ = $\hat{b}_{i-1,j}$ + c$_u$($\hat{b}_{i,j}$ − $\hat{b}_{i-1,j}$)
   End for
   $\hat{x}_i$ = MaxT2PAxis
   $\hat{m}$ = i
   break;      \\break the "for i=0 to m" loop
   End if
   If$^{\hat{x}_i < MinT2PAxis}$,      \\ lower T2PAxis bound $$c_l = \frac{MinT2PAxis - \hat{x}_i}{\hat{x}_{i+1} - \hat{x}_i}$$

For j=0 to n
      $\hat{a}_{i,j}$ = $\hat{a}_{i,j}$ + c$_l$($\hat{a}_{i+1,j}$ − $\hat{a}_{i,j}$)
      $\hat{b}_{i,j}$ = $\hat{b}_{i,j}$ + c$_l$($\hat{b}_{i+1,j}$ − $\hat{b}_{i,j}$)
   End for
   $\hat{x}_i$ = MinT2PAxis
   End if
End for 4) If r<0, calculate the values for the T2PAxis$_m$.

```
If r < 0,
        x_m - x̂_m
  c_r = ─────────
        x̂_m - x̂_{m-1}

For j=0 to n,
      â_{m,j} = â_{m,j} + c_r(â_{m,j} - â_{m-1,j})
      b̂_{m,j} = b̂_{m,j} + c_r(b̂_{m,j} - b̂_{m-1,j})
  End for
  x̂_m = x_m
End if
```

5) If r>0, calculate the values for the T2PAxis$_0$.

```
If r > 0
        x_0 - x̂_0
  c_0 = ─────────
        x̂_1 - x̂_0

For j=0 to n,
      â_{0,j} = â_{0,j} + c_0(â_{1,j} - â_{0,j})
      b̂_{0,j} = b̂_{0,j} + c_0(b̂_{1,j} - b̂_{0,j}) //extrapolate
  End for
  x̂_0 = x_0
End if
```

6) Remove overlap bins at left side if there is any

```
i=0
While (x̂_{i+1} -- x̂_0)
    i=i+1
End while
If i>0,                    // remove overlap bins
    For k = i to m
        For j=0 to n,
            â_{k-i,j} = â_{k,j}
            b̂_{k-i,j} = b̂_{k,j}
        End for
    End for
    m̂ = m - i              // NumT2PAxisValues reduction
End if
```

7) If r<0, restore the boost B in the shifted T2PUp/Dn curves:

```
If r < 0
    For j=0 to n
    If(Bj > 0)

x̂_{m̂+1} = x̂_m̂ x̂_m̂ = x_{m-1} x̂_m̂ - x̂_{m̂-1}
        c_b = ─────────────
             x̂_{m̂+1} - x̂_{m̂-1} break;
    End if
    For j=0 to n
        If (Bj > 0)
            â_{m̂+1,j} = â_{m̂,j}
            b̂_{m̂+1,j} = b̂_{m̂,j}
            â_{m̂,j} = â_{m̂-1,j} + c_b(â_{m̂+1,j} - â_{m̂-1,j})
            b̂_{m̂,j} = b̂_{m̂-1,j} + c_b(b̂_{m̂+1,j} - b̂_{m̂-1,j})
            â_{m̂+1} = â_{m̂+1} + B_j
            b̂_{m̂+1} = b̂_{m̂+1} + B_j
        End if
    End for
    For j=0 to n
        If (Bj > 0)
            m̂ = m̂ + 1
            Break;
        End if
    End for
End if
```

8) If any of the above calculated $â_{i,j}$ and $b̂_{i,j}$ is larger than the maximum value allowed by the standard, it shall be set to the maximum value allowed by the standard (31.75 dB). Similarly, if any the above calculated $a_{ij}*$ and $b_{ij}*$ is smaller than the minimum value allowed by the standard, it shall be set to the minimum value allowed by the standard (−32 dB).

$$â_{i,j} = \max(\min(â_{ij}, 31.75), -32)$$

$$b̂_{i,j} = \max(\min(b̂_{i,j}, 31.75), -32)$$

where $i=0, \ldots, m̂, j=0, 1, \ldots, n$

In embodiments that include a maximum throughput level, a Maximum Throughput Limit Algorithm may be used to set parameters indicating the maximum throughput for each mobile unit as a function of the available reverse link bandwidth (RL_BE_Bandwidth). For example, parameters indicative of the maximum throughput may be determined in a 1xEVDO Rev A system that allocates the resource domain of T2P. However, persons of ordinary skill in the art having benefit of the present disclosure should appreciate that the concept can be generalized to other communication systems that implement distributed resource management operations. The maximum throughput may be set by projecting the throughput limit onto the resource domain of the system. This resource limit may then be imposed upon the resource utilization of individual users. In the context of 1xEVDO system, for a given throughput limit, the access network may calculate the corresponding T2PInflow limit, which can be represented as the attribute T2PInflowRange and/or T2PInflowMax, by multiplying the throughput limit (in kbps) with the T2P consumed per kbps transmission, where the T2P consumed per kbps can be obtained from link level performance results. In additional, a set of boundary condition may also be checked to make sure the T2PInflowRange and/or T2PInflowMax falls into the selected range.

One example of a maximum user throughput limit algorithm uses a conversion factor to determine the value of the attribute T2PInflowMax. In this example, the maximum throughput limit algorithm uses the value of the RL_BE_Bandwidth (in unit of kbps), which represents the maximum user throughput limit defined by service providers. The access network then calculates T2PInflowMax (dB) in the complex attribute T2PInflowRange by the following equation:

$$T2P\text{InflowMax} = 10 * \log 10(\text{Conversion\_Factor} * RL\_BE\_\text{Bandwidth}) \text{ (dB)}$$

where the Conversion_Factor is a constant parameter with units of T2P per kbps. However, persons of ordinary skill in the art having benefit of the present disclosure should appreciate that this exemplary maximum throughput limit algorithm is intended to be illustrative and not to limit the present invention.

Different throughput limits may be assigned to different priority weights and the maximum throughput algorithm may then be invoked to calculate the value of T2PInflowMax corresponding to each of the throughput limits. The access network may then transmit information indicating the maximum throughput (e.g., information indicating the value of T2PInflowRange and/or T2PInflowMax corresponding to the mobile unit's priority weight) as part of the configuration information transmitted to the mobile unit. Once the mobile unit has received the configuration information indicating the maximum throughput, the mobile unit can automatically limit the value of T2PInflow value to be less than or equal to T2PInflowMax and/or within the range indicated by T2PInflowRange.

Figure 3:
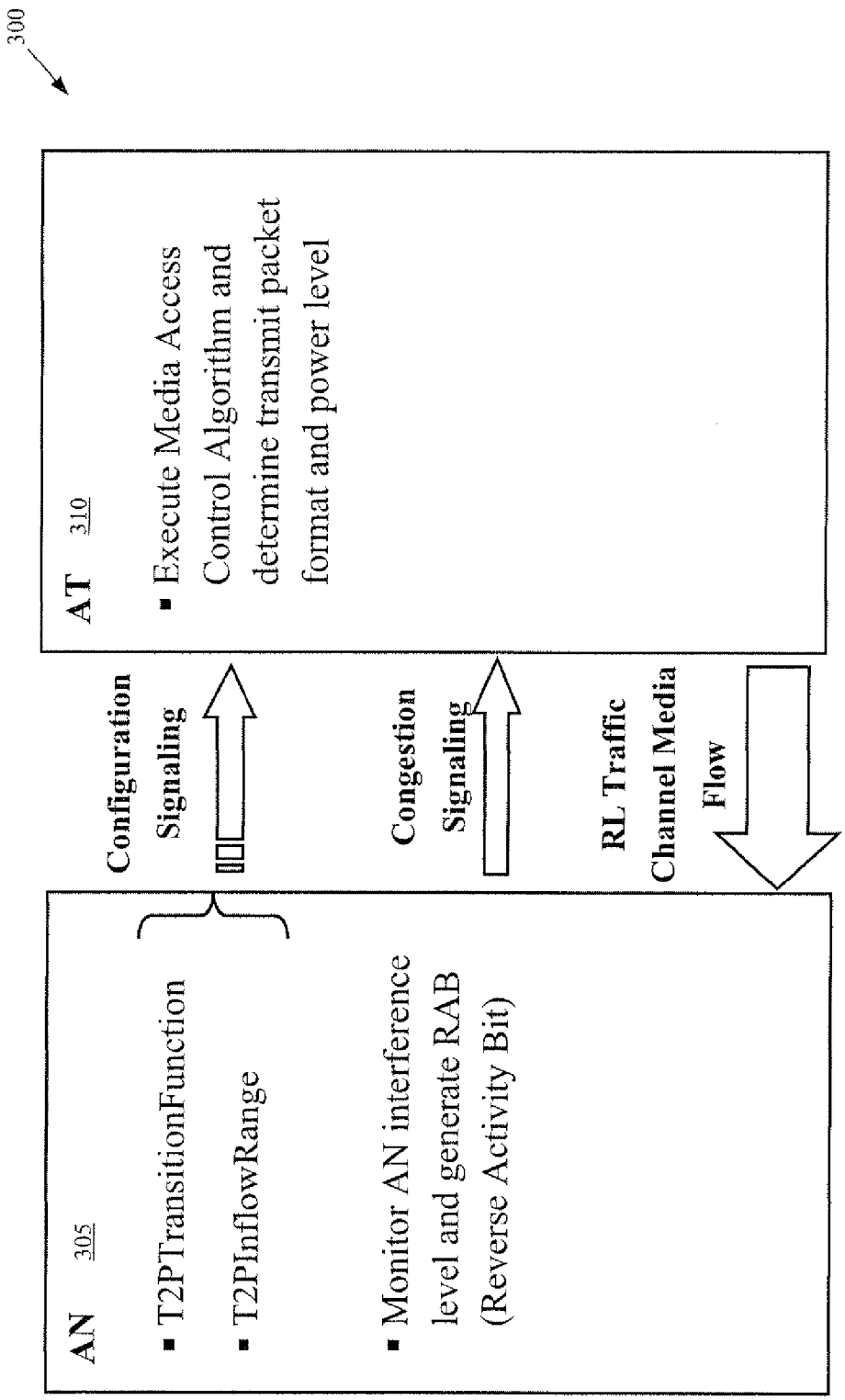
FIG. 3 conceptually illustrates one exemplary embodiment of a method of a signaling flow used in the resource allocation for uplink transmission from a mobile unit, in accordance with the present invention.

FIG. 3 conceptually illustrates one exemplary embodiment of a signaling flow 300 used in the resource allocation for uplink transmission. In the illustrated embodiment, an access network 305 implements algorithms that are used to calculate the attributes T2PTransitionFunction and/or T2PInflowRange based on a priority weights and/or throughput limits associated with one or more access terminals 310, as discussed herein. These attributes may then be transmitted to the access terminals 310 as part of the configuration signaling that is communicated between the access network 305 and the access terminal 310. For example, the configuration signaling may be transmitted over a signaling channel of the downlink.

Once the access terminals 310 have been configured using the attributes determined by the access network 305, operation of the access terminal 310 may be governed by parameters such as the congestion level at the access network. In the illustrated embodiment, the access network 305 may broadcast congestion information to the access terminals 310. For example, the access network 305 may broadcast a binary "0" when the access network 305 is not congested and the access network 305 may broadcast a binary "1" when the access network 305 is congested, e.g., as a result of a large amount of traffic and/or a large number of access terminals 310 accessing the wireless communication system via the access network 305. Congestion information may be broadcast on relatively short time scales. For example, conventional access networks 305 may broadcast congestion information approximately every millisecond. The relatively short time period between successive transmissions of congestion information implies that the wireless communication system converges to a stable configuration on a relatively short time scale, e.g., much less than approximately 1 second.

Once the attributes have been configured at the access terminal 310, the access terminal 310 can allocate resources based on these functions and the received congestion information. In the illustrated embodiment, the access terminals 310 receive congestion information transmitted by the access network 305. At each update instance corresponding to reception of congestion information, the access terminals 310 calculate the current allowable T2P resource based on the network's congestion feedback. In one embodiment, the allowable T2P resource may be a function of the current T2PInflow value and the residual T2PInflow accumulated. When the network is not congested, access terminals 310 can increment the T2PInflow value by an amount that may be calculated based on the T2PUpFunction corresponding to the assigned priority weight, inputs from the long term average of the network loading (e.g., as indicated by the FRAB values) and the current T2PInflow value. Conversely, when the network is congested, the access terminals 310 may decrement the T2PInflow value by an amount that is calculated based on the T2PDownFunction corresponding to the assigned priority weight, and using inputs from the long term average of the network loading (e.g., as indicated by the FRAB values) and its current T2PInflow value.

The access terminals 310 may then transmit information over the uplink in the reverse link traffic channel media flow using a traffic power level that is selected based upon the determined traffic-to-pilot ratio. For example, the access terminals 310 may execute a media access control algorithm to determine the packet format and/or power level that may be used to transmit the data over the uplink. The media access control algorithm may use one or more of the attributes transmitted by the access network 305 and/or the congestion information.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method implemented in a mobile unit configured to communicate with at least one base station over an uplink, comprising:
   receiving, at the mobile unit and from the base station, a first attribute indicative of a traffic-to-pilot power ratio used by the mobile unit for uplink transmission, the first attribute being formed based on a priority weight associated with best effort communication with the mobile unit, wherein higher values of the priority weight indicate higher permitted throughputs for transmissions over the uplink during best effort communication; and
   modifying an uplink transmission power based upon the first attribute and information indicative of congestion at the base station.

2. The method of claim 1, wherein receiving the first attribute comprises receiving a first attribute formed based on one of a plurality of priority weights selected for best effort communication between the mobile unit and the base station.

3. The method of claim 1, wherein modifying the uplink transmission power comprises modifying a ratio of an uplink traffic channel power to a pilot channel power based on the first attribute.

4. The method of claim 3, wherein modifying the ratio of the uplink traffic channel power to the pilot channel power comprises increasing the ratio in response to receiving information indicating congestion at the base station.

5. The method of claim 4, wherein increasing the ratio comprises increasing the ratio by an amount determined based upon the current value of the ratio and information indicating a long-term average of network loading.

6. The method of claim 3, wherein modifying the ratio of the uplink traffic channel power to the pilot channel power comprises decreasing the ratio in response to receiving information indicating absence of congestion at the base station.

7. The method of claim 6, wherein decreasing the ratio comprises decreasing the ratio by an amount determined based upon the current value of the ratio and information indicating a long-term average of network loading.

8. The method of claim 1, comprising receiving, at the mobile unit and from the base station, a second attribute indicative of a maximum throughput associated with best effort communication.

9. The method of claim 8, wherein modifying the uplink transmission power comprises modifying the uplink transmission power such that the uplink throughput is less than or equal to the maximum throughput.

10. The method of claim 1, comprising transmitting information over the uplink using the modified uplink transmission power.

11. The method of claim 1, comprising receiving said information indicative of congestion at the base station in a broadcast transmission from the base station.

12. A method implemented in a base station configured to communicate with a plurality of mobile units, comprising:
    providing, to each of the mobile units and from the base station, a first attribute indicative of a traffic-to-pilot power ratio used by each of the mobile units for uplink transmission, the first attribute being formed based on at least one priority weight associated with best effort communication between the base station and the mobile units, wherein higher values of the priority weight indicate higher permitted throughputs for transmissions over the uplink during best effort communication; and
    receiving transmission from the mobile units at an uplink transmission power determined by each mobile unit based upon the first attribute and information indicative of congestion at the base station.

13. The method of claim 12, wherein providing the first attribute comprises providing a plurality of first attributes, each first attribute formed based on one of a plurality of priority weights associated with best effort communication between the mobile units and the base station.

14. The method of claim 12, wherein providing the first attribute comprises providing the first attribute in response to the mobile unit powering up or handing off to the base station.

15. The method of claim 12, comprising receiving information indicating the priority weights for the mobile units.

16. The method of claim 15, wherein receiving information indicating the priority weights for the mobile units comprises receiving information indicating priority weights that are determined so that the uplink transmission powers for the mobile units converge to selected values of the uplink transmission powers at equilibrium.

17. The method of claim 12, comprising providing at least one of information indicating a congestion level at the base station or information indicating a long-term average of network loading.

18. The method of claim 12, comprising determining second attributes indicative of a maximum throughput associated with best effort communication by each of the plurality of mobile units.

19. The method of claim 18, wherein determining the second attributes comprises determining a ratio of a traffic channel power to a pilot channel power that corresponds to the maximum throughput.

20. The method of claim 19, comprising providing information indicative of the maximum throughput to the plurality of mobile units.

21. The method of claim 20, comprising receiving uplink transmissions from the plurality of mobile units, the uplink transmission power being set at a value that is less than or equal to an uplink transmission power corresponding to the maximum throughput.

22. The method of claim 12, comprising broadcasting said information indicative of congestion at the base station.

* * * * *